United States Patent [19]
Eden

[11] Patent Number: 5,175,646
[45] Date of Patent: Dec. 29, 1992

[54] REFLECTIVE ROLL-UP SIGNS

[76] Inventor: Elizabeth A. Eden, R.R. #1, Box 322, Alexandria, Ind. 46001

[21] Appl. No.: 528,225

[22] Filed: May 24, 1990

[51] Int. Cl.$^5$ .......................................... G02B 5/128
[52] U.S. Cl. .................... 359/536; 359/546; 40/610
[58] Field of Search .............. 350/103, 105, 109; 427/163; 404/6; 40/219, 539, 610

[56] References Cited

U.S. PATENT DOCUMENTS

| | | | |
|---|---|---|---|
| 2,407,680 | 9/1946 | Palmquist et al. | 88/82 |
| 3,190,178 | 6/1965 | McKenzie | 88/82 |
| 3,288,618 | 11/1966 | DeVries | 106/148 |
| 3,591,116 | 7/1971 | Dalum | 40/610 |
| 4,025,674 | 5/1977 | Mizuochi | 428/29 |
| 4,075,049 | 2/1978 | Wood | 359/536 |
| 4,367,920 | 1/1983 | Tung et al. | 350/105 |
| 4,511,210 | 4/1985 | Tung et al. | 350/105 |
| 4,544,586 | 10/1985 | Molari | 428/29 |
| 4,694,601 | 9/1987 | Dicke et al. | 40/610 |
| 4,712,868 | 12/1987 | Tung et al. | 359/536 |
| 4,763,985 | 8/1988 | Bingham | 350/105 |
| 4,817,318 | 4/1989 | Strauch | 40/610 |
| 4,817,319 | 4/1989 | Vitale | 40/610 |

FOREIGN PATENT DOCUMENTS 1390605  4/1975  United Kingdom .................. 5/128

*Primary Examiner*—Loha Ben

[57] ABSTRACT

Retroreflective sheeting is usually provided as rolls with an adhesive backing for application to rigid road and other signs. Roll-up signs are those small signs having folding frames holding a flexible material placed to caution traffic about temporary workers. On completion of the tasks the frames are folded, and the signs are rolled up for future use. Such signs, contemplated herein, present problems other than flexibility. In addition to weather resistance, durability, and foldability, means for attaching the signs to the stands must be devised. Generally the sign material is provided with pockets. But most plastics cannot be readily sewn. The resulting needle holes weaken the sewn area so that the pocket readily tears out, or at least partially away, from the sign. The usual method for making such signs, then, is to attach the pockets by fusion using heated die elements. The deformation which occurs when the heated die is impressed to bring about the heat fluidization usually weakens the plastic. Herein a long-lasting roll-up sign is provided having durable pockets which are not fusion deformed.

7 Claims, 1 Drawing Sheet

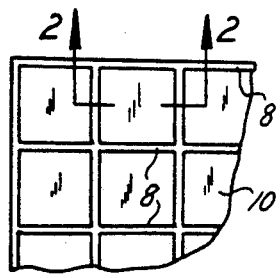
FIG. 1.
(PRIOR ART)
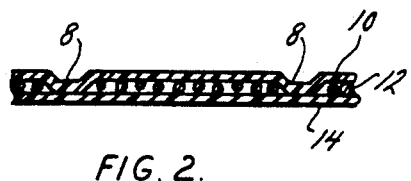
FIG. 2.
(PRIOR ART)
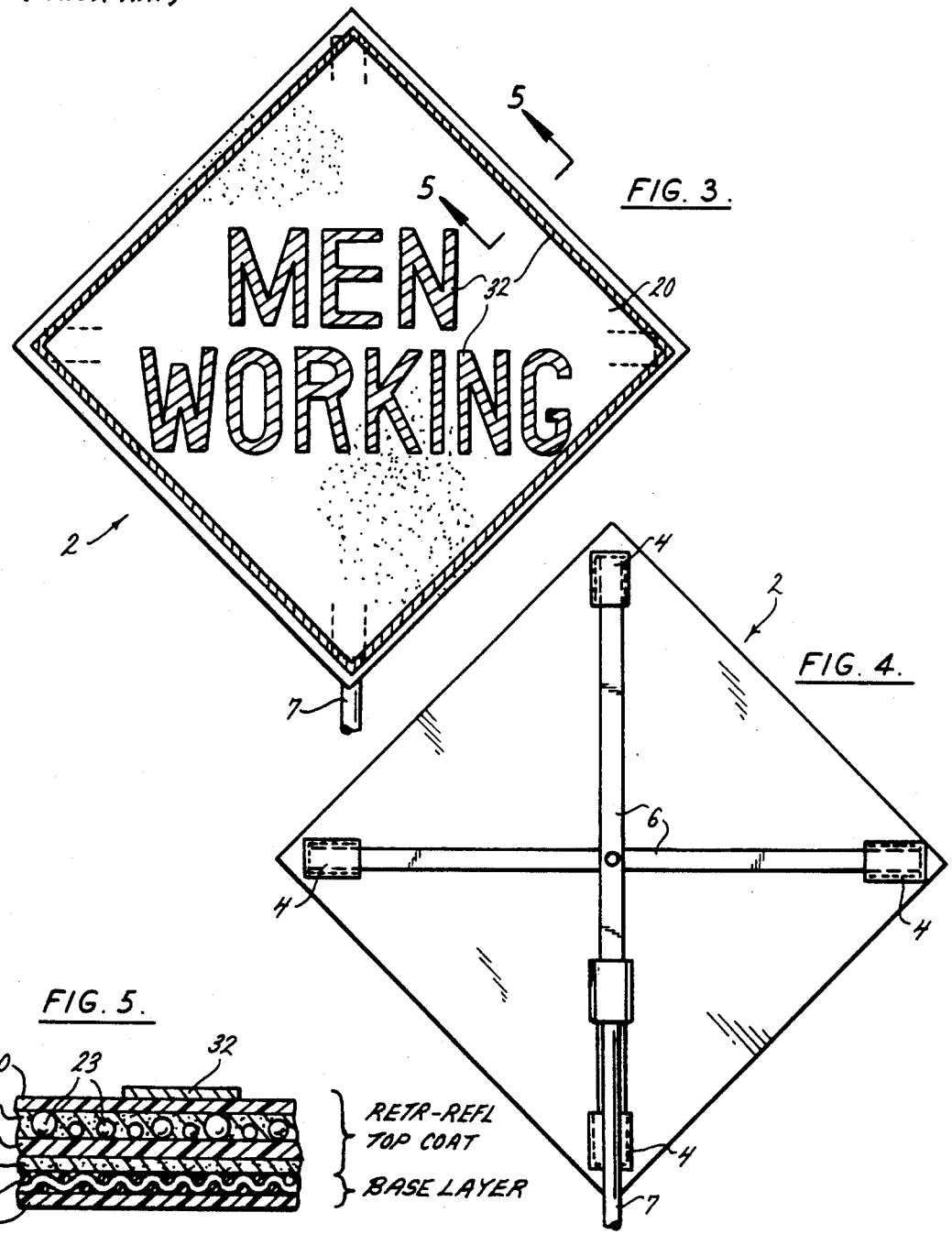
FIG. 3.
FIG. 4.
FIG. 5.

REFLECTIVE ROLL-UP SIGNS

BACKGROUND OF THE INVENTION

In one of its aspects this invention pertains to retroreflective sheeting. In a more specific aspect the invention relates to flexible, reflective roll-up signs intended for use in conjunction with various types of flexible sign support stands.

Flexible, reflective, roll-up signs are used to provide traffic control information temporarily, during short-term periods, such as for highway mowing, small construction jobs, survey crews, utility crews, highway line striping crews, tree trimming crews, and cable television crews. They are in the form of retroreflective sheeting having pockets which fit on a stand which can be collapsed so that the sign can be rolled up after use.

Retroreflective sheeting is well known, as exemplified in U.S. Pat. Nos. 4,763,985, 4,511,210, 4,367,920, 4,075,049, 4,025,674, 3,288,618 and 3,190,178, the disclosures of which are incorporated by reference herein. However, for the most part the sheeting is provided as rolls with an adhesive backing for application to metal road signs, license plates and the like. In the fabrication of such sheets, no thought has been given to problems other than reflectivity and flexibility, such as those presented by roll-up signs of the type shown in FIG. 3. Such roll-up signs as sign 2 must be provided with means such as pockets 4 in order to be held by a supporting means such as cross arms 6 of collapsible stand 7. Hence in addition to weather resistance, durability and foldability, means for attaching pockets must be devised.

For the most part, plastics cannot be sewn. The resulting needle holes weaken or tear the sewn area so that the pocket quickly pulls away. The usual method for providing such pockets, then, has been to attach them by fusion, using heated die elements in a process similar to that used in U.S. Pat. No. 3,190,178 to produce the high brilliancy hermetically sealed bead pockets. However the deformation which occurs when the heated die is impressed to bring about the heat fluidization usually weakens the plastic. In roll-up signs made by fusion processes, pockets tear out, or at least partially out and, as a result of exposure to the atmosphere, lose their brilliance. Roll-up signs, therefore, are subject to improvement. By this invention, a long-lasting roll-up sign is provided which retains its brilliancy with age, and which has durable pockets which are not weakened by stitching, nor deformed by thermoforming.

SUMMARY OF THE INVENTION

A flexible reflective roll-up sign is provided herein, which includes a collapsible supporting stand to be placed in a temporary work zone, and a retroreflective sheet provided with pockets adapted to fit on the collapsible supporting stand. The retroreflective sheet is a combination of: (a) a laminate including a top protective layer, a layer of reflective mircospheres in a binder, and a spacing layer; with (b) a vinyl-cloth base layer capable of being sewn. Pockets fitting the supporting stand are sewn on the base layer. The retroreflective laminate is bonded to the base layer by an adhesive layer capable of being thermoformed.

BRIEF DESCRIPTION OF DRAWINGS

For a better understanding of the invention reference is made to the accompanying drawings.

FIG. 1 is a schematic plan view of a prior art sheeting fragment;

FIG. 2 is a cross-sectional view taken through 2—2 of FIG. 1;

FIG. 3 is a front elevational view of a roll-up sign for use in a work area according to the present invention;

FIG. 4 is a back elevational view of the roll-up sign shown in FIG. 3,

FIG. 5 is a partial cross-sectional view taken through 5—5 of FIG. 3.

DETAILED DESCRIPTION OF THE INVENTION

One of the concerns in the fabrication of reflective traffic control signs has been the retention of their brilliancy. To this end in U.S. Pat. No. 3,190,178, a plurality of hermetically isolated pockets were formed by intersecting grid lines 8 as shown in FIG. 1. Each pocket is isolated from adjacent pocket areas, and each is characterized by exhibiting high-brilliancy reflection of incident light. However, as pointed out in the patent, sealing the edges of such structures is difficult. Such a process, then, is not the best means for attaching pockets to roll-up signs. In fact delamination and accompanying loss of brilliancy have always been a consideration. Thus, in U.S. Pat. No. 4,075,049 another hermetically sealed retroreflective sheeting is provided. This sheeting has improved resistance to delamination. Hence the provision of the necessary pouches such as roll-up sign pockets 4 is not without problems.

To further clarify these problems, the fabrication of difficult-to-seal retroreflective sheets should be considered. In general, such sheets include a layer of reflective microspheres in a binder, a cover coating or transparent, top layer, a lower spacing layer, and an adhesive layer for affixing the sheet to a substrate, usually a metal or wood sign. In the prior art sheeting illustrated in FIG. 2, for instance, 10 designates a transparent top layer; 12 is the microsphere layer; and 14 is the spacing layer. The sheeting may or may not include a reflective material such as a coating on the sphere, a pigment, metallic particles, or inorganic salts.

Usually the microspheres are beads in the 60 to 90 micron size range, each having a refractive index of about 2.26, and the binder in which they are embedded is a polyethylene polymer, a polypropylene polymer, or an acrylic such as acrylonitrile copolymers.

Herein it has been found possible to fabricate a strong roll-up sign while utilizing the technology resulting in a top layer which does not lose its reflectivity. The top layer, or cover coating, is usually an acrylic resin, alkyd resin, polyurethane resin, polyester resin or polyvinyl butyrate, and the spacing layer is a thermosetting acrylic resin, an epoxy resin, or any of the resins employed in the top layer. To bond this laminate, or laminated composite, to the substrate, any of the known bonding adhesives can be employed. Desirable bonding adhesives are thermoplastic resins such as ABS, polycarbonates, polyether imides, polyethylene, polyurethane and the like.

For the most part, except in the case of some clothing, reflective sheets have been applied to rigid sign substrates. Satisfactory roll-up signs have not been made. We have found, however, that a vinyl resin-fabric laminate such as a polyvinyl chloride and denim can be employed as a substrate. With this substrate, pockets 4 fitting cross arms 6 of collapsible stand 7 can be sewn on without tearing the plastic layers or putting permanent holes in them. Other strong fabrics such as sailcloth, duck, gabardine, drill, etc. can be used, depending on strength requirements. A mildew resistant marine grade denim fabric is preferred.

A cross section of a desired roll-up traffic control sign is shown in FIG. 5. Layer 20 is the top or cover coating. Layer 22 is an acrylic binder having the microspheres embedded therein. Layer 24 is the spacing layer and 26 is the thermoplastic or heat-activated bonding adhesive which bonds the upper laminate to the fabric-plastic substrate.

For plastic film 30, vinyl polymers and copolymers are preferred such as polyvinyl chloride, vinyl formal, vinyl butyral and blends of those vinyl polymers with acrylonitriles and acetates. The upper laminate, layers 20, 22 and 24, and the substrate, layers 28 and 30, can be fabricated by any of the composite processing techniques such as closed molding, pultrusion, pulforming and vacuum forming. After the two composites are formed they are then bonded through heat activated adhesive 26. The required legend 32 can then be applied. The resulting material lends itself well to the construction of pockets 4 which do not pull off and, more importantly, do not tear away leaving a hole in the sign.

PREFERRED EMBODIMENT

As an example, the invention herein provides a flexible, retroreflective roll-up sign in the form of an upper multi-layered or laminated construction bonded to a lower base layer. The upper layer includes a 2 mil pigmented PVC top layer, a high performance acrylic based pressure sensitive adhesive holding high refractive index glass beads (spheres), a urethane plastic spacer layer, all laminated together by a heat-activated adhesive. This upper composite forms a laminate offering a long-lasting "Engineer grade" reflectivity, Type II LS-300C Federal specification. A silk screen-printed legend is then applied to the top layer of the roll-up sign. An alternative form of legend can be characters cut out of 2 mil vinyl, say PVC, which are then applied to the top layer using a heat-activated adhesive coating along with heat and pressure in a heat/vacuum laminator.

The base layer includes a vinyl film laminated to mildew-resistant marine grade denim cloth. Sewn on pocket assemblies fit fiberglass sign support arms (ribs) which are affixed to a separate sign support stand. The top retroreflective sheeting laminate and the base layer (vinyl/denim laminate) are laminated together using the heat activated adhesive layer of the reflective sheeting as a binder. The actual lamination process is accomplished under heat and pressure in a heat/vacuum laminator.

The roll-up sign of the invention thus includes a glass bead enclosed lens reflective sheeting rather than either an encapsulated glass bead sheeting or a microprism reflective sheeting. The lamination of dissimilar top and base layers provides for the strong pockets. The result is a smooth, uninterrupted top layer outer surface rather than the sealed grid pattern top surface of existing roll-up signs. In addition punctures of the top layer of the sign resulting from the pocket sewing operations do not adversely affect the reflective performance of the sign. The sign offers outstanding reflectivity, and superior abrasion-resistant performance compared to existing roll-up sign products.

Given the teachings of this invention modifications will occur to those skilled in the art. For instance, between spacing layer 24 and binder layer 26, a vacuum metallized reflective layer can desirably be included. In addition, rather than being transparent, layer 20 can be a translucent polyvinyl chloride layer. Such ramifications and variations are deemed to be within the scope of this invention.

The invention is not to be restricted to the embodiments given herein for purposes of illustration, but only to the scope of the claims appended hereto and their equivalents.

What is claimed is:

1. A flexible reflective roll-up sign including a collapsible supporting stand to be placed in a temporary work zone, and a long lasting retroreflective sheeting having pockets thereon in order to fit on the supporting stand, the retroreflective sheeting including a top protecting layer, a layer of reflective microspheres, and a spacing layer, in combination with a laminated vinyl-cloth base layer capable of being sewn to provide the pockets, the retroreflective sheeting being bonded to the vinyl-cloth base layer by an adhesive layer capable of being thermoformed.

2. The roll-up sign of claim 1, including a vacuum metalized reflector coating layer between the spacing layer and the adhesive layer.

3. The roll-up sign of claim 2, wherein the top protecting layer is a translucent vinyl layer silk screened with an appropriate sign legend.

4. The roll-up sign of claim 2, wherein the spacing layer is a urethane layer.

5. The roll-up sign of claim 2, wherein the vinyl-cloth base layer is mildew resistant denim.

6. The roll-up sign of claim 2, wherein the collapsible supporting stand is provided with fiberglass cross arms.

7. The roll-up sign of claim 1, having pockets sewn thereon, the pockets being fabricated of vinyl-cloth base layer material.

* * * * *